United States Patent Office 3,784,662
Patented Jan. 8, 1974

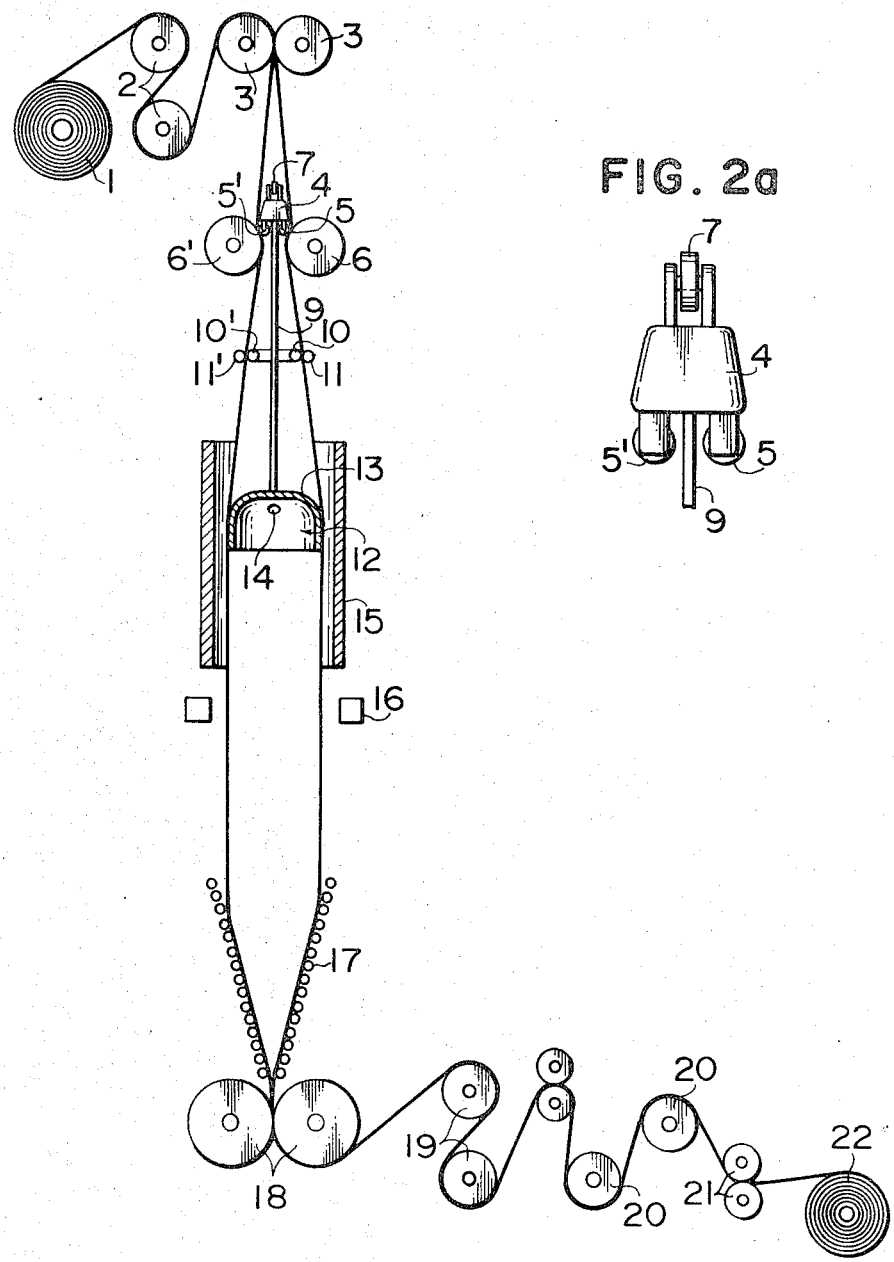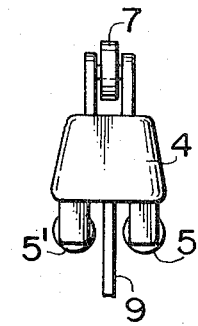

3,784,662
PROCESS AND APPARATUS FOR PRODUCING UNIAXIALLY STRETCHED ARTICLES DIFFICULT TO SPLIT LONGITUDINALLY
Hiroyuki Hino, Hiroyoshi Asakuno, and Tetsuya Yamada, Ichiharashi, Japan, assignors to Chisso Corporation, Osaka, Japan
Filed Oct. 6, 1971, Ser. No. 186,891
Claims priority, application Japan, Oct. 13, 1970, 45/89,882
Int. Cl. B29d 7/24; D06c 5/00
U.S. Cl. 264—95                                7 Claims

ABSTRACT OF THE DISCLOSURE

A uniaxially stretched tubular film of thermoplastic resin difficult to split in the longitudinal direction is produced from an unstretched tubular film of thermoplastic resin, by a process in which said unstretched tubular film is passed through a nip of feeding roll means, then passed vertically downwards the outside surface of a mandrel while enveloping the latter and while being heated from the outside, said mandrel being suspended by the nip of two parallel sets of mutually abutting roll means, and then the resultant film is drawn out by a roll means whose peripheral speed is greater than that of feeding roll means to effect longitudinal stretching, and in which said mandrel has a peripheral length equal to or slightly smaller than the peripheral length of the unstretched tubular film, the inside of said tubular film between the mandrel and the drawn out roll means is filled with a gas under pressure.

CROSS REFERENCES

U.S. Pat. 3,678,545 is our prior patent disclosing related subject matter.

DESCRIPTION OF THE INVENTION

This invention relates to a process for producing a uniaxially stretched, tubular film of thermoplastic resins, as well as an apparatus therefor, and further to an improvement in the process for producing uniaxially stretched tapes or flat yarns of thermoplastic resins.

Uniaxially stretched articles of thermoplastic resins have heretofore been used as binding cords for the general package or as raw material yarns for weaving or knitting bags such as those for cereals, fertilizers, etc., in place of straw cords, jute or the like. However, such uniaxially stretched articles, e.g. film, of thermoplastic resins have a drawback of being easily split. For example, in a a process where uniaxially stretched articles in a tape form having a small width are woven into fabrics, the articles are brought in contact with guide bars, tension-controlling apparatuses, reeds, etc., in a state under a considerable tension. Rubbing at that time causes fluffs, which result in not only reducing the efficiencies of various processes such as winding on bobbin, warping, weaving, etc., but also reducing the strength of tapes. When stretched articles are used as cords for automatic binding machines, such fluffs are brought inside the automatic cutting and binding mechanism, and this results in lowering the function.

Various studies have been carried out in order to overcome such a drawback. Among methods practically used, there is one in which various kinds of resins, inorganic substances, etc. are blended into a resin as a base, but, even when the drawback of being easy to split may be improved by this method, it is the present status of the art that a new problem is brought about in the point that film-making, stretching, etc. become difficult. As a method for mechanically solving the problem of the easily splittable property, an attempt according to biaxial stretching may be considered, but tapes prepared by slitting a biaxially stretched film, have such drawbacks that they are much more reduced in strength than uniaxially stretched tapes, and also, are readily broken when notch are applied. Thus, such tapes can be hardly applied as cords, raw material yarns for fabrics, etc., to the fields of uniaxially stretched articles.

A principle that longitudinal stretching of thermoplastic resin film, particularly, crystalline polypropylene film, carried out without accompaniment of shrinkage in the lateral direction, can produce stretched articles which are resistant to splitting, has already been applied to the production of bands, and the production of uniaxially stretched articles of cords, raw material yarns for fabrics, etc. by means of a biaxially stretching machine may be theoretically possible, but such production has never been practically carried out.

A representative process for biaxially stretching a tubular film having been heretofore carried out, resorts to expanding a tubular film by blowing a gas therein, shutting the inside thereof from the open air at both the ends of the film by means of die or pinch rolls to form a bubble, further introducing a gas under a pressure inside the bubble, and stretching the film on heating. However, if this method is applied to uniaxial stretching of a tubular film of thermoplastic resins, the heated part often shrinks simultaneously when it is stretched in the longitudinal direction. Thus, the inside pressure within the bubble increases.

This makes the soft part of the film successively entering the heating zone, to expand. At this time, since the inside pressure within the bubble becomes smaller the above-mentioned shrinking phenomenon occurs again on the successively coming film. Because of such phenomena, a process for stretching a tubular film in the longitudinal direction without any shrinkage in the lateral direction, by introducing a gas under pressure inside the bubble, has never been practically carried out.

As an improvement in the above-mentioned process, a process (1) may be considered which comprises inserting a mandrel inside a tubular film and stretching it along the mandrel. Among such process, there is the one described in Japanese patent publication No. 18,537/1963 in which continuous production of a tubular film and stretching thereof are carried out by using mandrel attached to a circular die. However, according to this process, the molten film having been textruded into a circular form is slowly cooled by air or the mandrel. Thus, such process is unsuitable for high speed mass-production. As an alternative process, there is a process (2) described in U.S. Pat. 3,313,870, in which a tubular film is opened by cutting, and a mandrel is inserted into the film from the cut-out portion. However, according to this process, a tension is applied to the cut-out portion of the film in the advancing direction of the film, and thus a notch is developed at the cut opening and propagates upwards. As a result, the width of the film is fluctuated, or a stretching breakage is brought about. These are the drawbacks of the prior art.

As another alternative process, there is a process (3) described in Japanese patent publication No. 15,483/1962, in which a mandrel is inserted in the inside of a tubular film without cutting out the film to carry out stretching. However, according to this process, since the mandrel-supporting rolls are located at the stretching part of the film or at an already stretched part, such mandrel cannot be utilized for uniaxial stretching. Because, uniaxially stretched films are much smaller in the strength in the lateral direction as compared with biaxially stretched films, and hence if a local tension is applied thereto after stretching, they are liable to split and continuous stretching becomes impossible.

A first object of the present invention is to provide a simple and efficient process and apparatus for uniaxially stretching a tubular film in the longitudinal direction while limiting the shrinkage in the lateral direction.

In the prior art process for producing stretched tapes having a small width, stretching has been carried out after slitting of film. In such a case, however, the smaller the slit width, the oftener occur stretching breakages due to fish eyes or foreign matters mixed in the resin, or due to dull edges of slitter. Thus, it has been difficult to increase the working efficiency above a certain extent. In order to avoid such a difficulty, it may be considered to stretch a film having a large width as it is, and thereafter slit the resulting stretched film. However, since the material prepared by uniaxially stretching a film having a large width by means of heating rolls, hot water or air oven in accordance with the prior art method, is very liable to split, the occurrence of fluffs is inevitable at the slitting step, and further, the range of the tension applicable to the film is very narrow at the time of continuous slitting by means of edges, and furthermore, the film is liable to obliquely split and break. Thus, the above-mentioned process of stretching a film having a large width as it is and thereafter slitting the resulting stretched film, has never been practically carried out. Further, according to the prior art process, the width of film is narrowed so extremely e.g. to below 50% of the original width, it has been difficult to stretch the film without causing any wrinkle on the film. In order to uniaxially stretch the film while limiting the shrinkage of the film in the width, it has been necessary to employ such an expensive process in which both the ends of the film are held by grips.

A second object of the present invention is to provide a simple and inexpensive process for uniaxially stretching a film having a large width as it is, without forming any wrinkle, and thereafter slitting the result stretched film.

According to the present invention a uniaxially stretched tubular film of thermoplastic resin difficult to split in the longitudinal direction is produced from an unstretched tubular film of thermoplastic resin, by a process in which said unstretched tubular film is passed through a nip of feeding roll means, then the nip of two parallel sets of mutually abutting roll means for supporting a mandrel passed vertically downwards the outside surface of a mandrel while enveloping the latter and while being heated from the outside, and then the resultant film is drawn out by a roll means whose peripheral speed is greater than that of feeding roll means to effect longitudinal stretching, and in which said mandrel has a peripheral length equal to or slightly smaller than the peripheral length of the unstretched tubular film, the inside of said tubular film between the mandrel and the drawn out roll means is filled with a gas under pressure whereby lateral shrinkage of the tubular film is prevented and the sum of nip line of two parallel sets of mutually abutting roll means for supporting the mandrel is at least ⅓ of the peripheral length of the mandrel.

Uniaxially stretched tapes or flat yarns can be produced by slitting the uniaxially stretched film thus prepared.

As the thermoplastic resins of said tubular film to be used in the present invention, there can be illustrated crystalline polyolefins such as crystalline polypropylene, crystalline polyethylene, crystalline propylene-ethylene copolymers, etc., polyamides, polyesters, etc.

In case where a tubular film is prepared from crystalline polyolefin, the stretching ratio of the film in the longitudinal direction is in the range of 3–8, preferably 4–6, while the proportion of the width of the stretched film to that of the unstretched film is in the range of 60–95%, preferably 65–85%. If the proportion is too small, the stretched film is liable to split in the longitudinal direction, while if it is too large, the stretched film is liable to break due to the effect of notches. The proportion of the width of the stretched film to that of the unstretched film can be varied by varying the ratio of the peripheral length of the unstretched film to that of said mandrel, and further the proportion can be also varied by varying the relative positions of said mandrel and the heating zone of said film, and/or the pressure of the gas inside the tubular film between said mandrel and said drawing pinch rolls. Namely, if the heating zone is located at a relatively upper position in relation to the mandrel, the proportion of the width of the stretched film to that of the unstretched film can be made larger, while if the heating zone is located at a relatively lower position in relation to the mandrel, the above-mentioned proportion can be made smaller.

The mandrel maintains the stretching part of the tubular film in a state of a circular form in the cross-section, inhibits the film from shrinking in the lateral direction, and fixes the position of the stretching part of the film.

If the film is stretched in an elliptical form of the cross-section, there may occur difference of tension applied between the direction of the short axis of ellipse and that of the long axis of ellipse which makes uniform stretching difficult. Thus, stretching should be carried out in a circular form of the cross-section or in a state close to a circular form.

If stretching is carried out with the air inside the film, alone, and without mandrel, a great stress is applied to the film in the inner direction thereof, at the stretching point. Thus, the film often shrinks at this part, and the air moves to another weak part of the film to expand the part. When such a phenomenon occurs intermittently, the stretching part cannot be fixed any longer, and stretching becomes impossible.

After passing a mandrel, a tubular film tends to shrink. In order to prevent such a shrinkage, it is necessary to seal a gas under a pressure, inside the tubular film between the mandrel and drawing pinch rolls.

Now, the present invention will be illustrated further in detail referring to the accompanying drawings.

FIG. 1 shows a schematical vertical cross-sectional view of the apparatus of the present invention.

FIG. 2a shows an enlarged front view of a part (supporting rolls fixed to a head block) of the apparatus of FIG. 1.

Figure 2B:
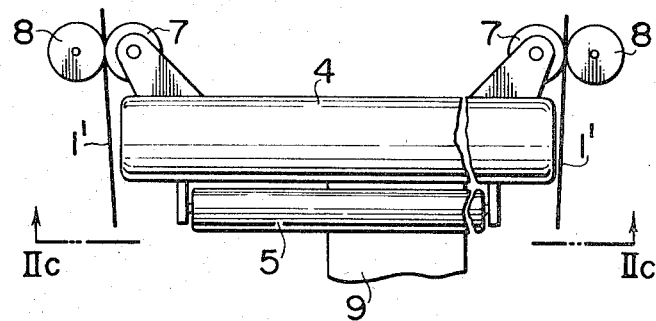
FIG. 2b shows a side view of the same part.

In FIG. 1, numeral 1 shows a large roll of raw material tubular film (which is unnecessary when the film is fed directly from a film-making extruder); numeral 2 shows preheating rolls (infrared heater, hot air oven, etc. can be substituted), and numeral 3 shows feeding pinch rolls.

The raw material tubular film in a state folded into two, is led to feeding pinch rolls 3 from which the folded film is expanded to give an elliptical cross-section; caused to travel vertically downwards in the state enveloping a mandrel 12; heated to a temperature within the range of the orientation temperature thereof by means of a heater 15 when the film passes on the mandrel 12, whereby stretching is effected; folded into two by means of guide plates 17 and drawing pinch rolls 18; heat-set by means of a group of heat-setting rolls 19; cooled by means of a group of cooling rolls 20; and wound on a winder 22.

It is preferable that feeding pinch rolls 3 are driven at a speed equal to the peripheral speed of preheating rolls or a faster speed by up to 5% of said speed, while receiving rolls 6 and 6' are driven at a speed equal to the peripheral speed of feeding rolls or a faster speed by up to 5% of said speed. Further, it is preferable that, receiving rolls 6 and 6' are forcedly driven because, at the start of stretching the tubular film must be passed through between supporting rolls 5, 5' and receiving rolls 6, 6'.

Figure 2C:
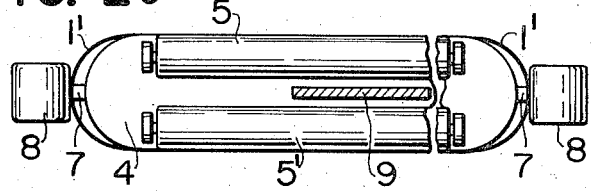
FIG. 2c shows a cross-sectional view of the part along IIc—IIc of FIG. 2b.

A rod 9 is extended upward from the mandrel 12; a head block 4 is fixed to the top of the rod 9; and supporting rolls 5 and 5' are rotatably fixed to the head block. The manner by which the supporting rolls 5 and 5' are fixed to the head block, is shown in FIGS. 2a, 2b and 2c. In FIG. 2c, there is shown a head stock 4 having an outline consisting of two parallel lines and two semicircles, but it is not always necessary that the end parts thereof be semicircles. Receiving rolls 6 and 6' are each located at least partially beneath the supporting rolls 5 and 5' and receive supporting rolls with a film therebetween. Supporting rolls 5 and 5' are pressed on the receiving rolls 6 and 6' by their own weights, the mandrel, etc. as well as the stretching tension of film, and hence are rotated at the same speed with that of the receiving rolls 6 and 6'. Thus, the mandrel is maintained in a suspended state, and the film is caused to travel downwards. If rolls are fixed to a mandrel and other rolls are provided outside the film and paired with the former rolls, the mandrel is laid in the horizontal position and the film is caused to travel in the lateral direction, then the weight of the mandrel is concentrated only upon the lower contacting point, and uniform stretching becomes impossible. Accordingly, the axial direction of mandrel should be vertical. Also, if the film is caused to travel upwards, a force which makes the mandrel float upwards is exerted by which the mandrel swings in the lateral direction and cannot hold stable state. Accordingly, the course of the film around the mandrel should be from upwards to downwards.

The raw material film is firmly held between the supporting rolls 5, 5' and the receiving rolls 6, 6', and hence, if contact is made only at a point, the film is liable to be injured and becomes the cause of breakage at stretching. Thus, it is necessary that contact of both the rolls is made along a line. Thus, the contacting line should be two solid or broken lines parallel to each other, and further it is necessary that the total sum of the length of these lines is at least ⅓ of the peripheral length of the film at this contacting part. Since the mandrel has a peripheral length equal to or slightly smaller than the peripheral length of the unstretched part of said tubular film, the total sum of the length of the contacting lines of the supporting rolls 5, 5' and the receiving rolls 6, 6' must be at least ⅓ of the peripheral length of the mandrel.

If the above-mentioned contacting lines deviate from the parallel relation even a little, or the radii of the rolls 5, 5' and 6, 6' are different even a little with regard to their axial directions, then there occurs a tendency that the rolls 5 and 5' deviate towards their axial directions. However, it is practically impossible to keep strict the parallel relation of the contacting lines as well as to make very strict the uniformity of the radii of the rolls relative to their axial directions. Thus, in order to prevent the rolls 5 and 5' from deviating relative to their axial directions, it is preferable that another set of rolls having the respective axes perpendicular to the respective axial directions of the rolls 5 and 5', are fixed near the rolls 5 and 5', for example, to the end of the head block 4, and received by another set of outside rolls. These rolls are shown in FIGS. 2b and 2c, as numerals 7 and 8, but roll 8 is omitted in FIGS. 1 and 2a, in order to avoid the complexity of these figures. Since the rolls 5 and 5' have a tendency that they deviate always in one direction, one set of the rolls 7 and 8 will be sufficient if the direction is confirmed in advance by experiment. In FIGS. 2b and 2c, the film is shown as numeral 1'. It is preferable that the upper part of mandrel 12 has an arcuate form, as shown in FIG. 1, as numeral 13. Further, it is preferable that the length of the mandrel in the longitudinal direction is small. If its length is large, the temperature of the mandrel becomes higher by the heat from the heater 15. Thus, the stretch-initiating point of the film tends to move upwards and thus the distance from the stretch-initiating point to the lower end of the mandrel becomes larger and the friction between the mandrel and the film becomes larger. On this account, the weak part of the film is expanded in the lateral direction, while the strong part is shrink and a force is exerted to push the mandrel in the lateral direction, making the stretching unstable, further increasing the unevenness of the thickness of film. Such a phenomenon occurs particularly when the stretching ratio is more than 5. Namely a large stress is exerted upon the film in the inner direction, just after the stretch-initiating point. Accordingly, when stretching is carried out on the surface of the mandrel, the friction-resistance between the mandrel and the film becomes larger, and uniform stretching becomes difficult. In such a case, it becomes necessary to increase the pressure of the air inside the tubular film to prevent the film from shrinking in the inner direction thereby to make the friction-resistance as small as possible. Also, it is necessary to adjust the relative positions of the heating zone and of the mandrel so that the stretch-initiating point may be located just after the mandrel.

On the other hand, if the length of the mandrel in the longitudinal direction is shortened, the weight of the mandrel becomes small, and the film clamped between the supporting rolls 5, 5' and the receiving rolls 6, 6' is hardly injured.

In order to prevent the mandrel from swinging during stretching, it is preferred to fix swing-preventing rolls 10 and 10' on both the sides of the above-mentioned rod 9, in the same axial direction with that of the rolls 5 and 6, and also in a freely rotatable state, and further to provide rolls 11 and 11' which form pairs of the former rolls and clamp the tubular film between both the rolls.

It is necessary to make the friction-resistance on the surface of the mandrel as small as possible, for example, by applying on the surface, a rough finish of 50 to 400 meshes according to ASTM standards, or by coating the surface with a heat-resistant synthetic resin or the like. If the surface is mirror-like a friction-resistance becomes larger, and the film sometimes is melted and broken due to the heat of friction. To the contrary, if the surface has a rough finish of less than about 50 meshes, the surface of the film is injured, which results in stretch-breakage. Even when no stretching-breakage occurs, stretched film having scratches on its surface and easy to split, are liable to be formed. Thus, such a rough surface is not desirous.

It is preferable that the mandrel 12 has an opening 14 to allow the gas above and below the mandrel to pass therethrough freely. The first reason for this opening is that, when a gas is introduced inside the tubular film at the time of start, a passage which allows the gas to pass to the upside of the mandrel is necessary when no clearance is formed between the mandrel 12 and the film. The second reason is that, at the time of start, an abnormally expanded part is often formed on the tubular film, and if there is no opening as mentioned above, the pressure of the gas below the mandrel rapidly increases and often breaks the tube especially, at the time when the expanded part is narrowed by the guide plate 17. If there is an opening as mentioned above, the gas escapes above the mandrel, and the increase of the gas pressure can be alleviated. The third reason is that, during the stretching, the air in the part above the mandrel is sent, along with the moving film, to the part below the mandrel through the clearance between the surface of the mandrel and the film, and if no opening as mentioned above is provided, the gas pressure in the part above the mandrel is reduced; the tubular film above the mandrel cannot be maintained in state fully swelled in the radial direction; and stable operation becomes impossible.

Figure 3A:
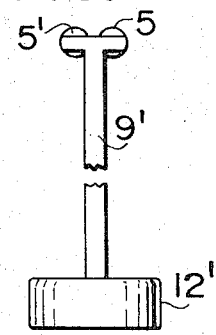
FIG. 3a shows a front view of supporting rolls fixed to another type of a mandrel.
Figure 3B:
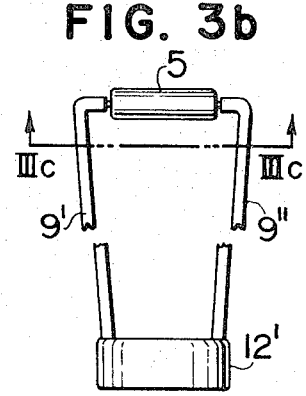
FIG. 3b shows a side view of the same part.
Figure 3C:
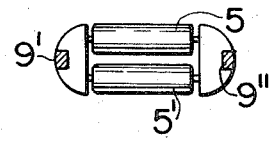
FIG. 3c shows a cross-sectional view of the same part along IIIc—IIIc of FIG. 3b.

Supporting rolls 5 and 5' can be also fixed to two rods 9', 9" extending upwards from a mandrel 12', as shown in FIGS. 3a and 3b.

As for the heater 15, any one having a structure capable of heating the tubular film uniformly, can be used. Infrared oven, hot air-circulating type oven, etc. can be illustrated. Numeral 16 shows an apparatus for blowing a cooling gas or a cooling water upon the film. By way of this apparatus, stretched film is solidified while preventing shrinkage. Guide plates 17, which are similar to those provided in the conventional apparatus for preparing inflation film, lead the film to pinch rolls 18, so that the film does not form wrinkle at the time of passing through drawing pinch rolls. It is preferable that these guide parts 17 consist of groups of rolls arranged in a plate form, as shown in FIG. 1. Drawing pinch rolls are driven rolls, and uniaxially stretched tubular films of thermoplastic resins having any given stretching ratio can be prepared by employing the arrangement wherein the ratio of the peripheral speed of the drawing rolls to that of the feeding rolls is variable optionally. Stretched film coming out of the drawing pinch rolls 18 in a wavy form, is heat-set and flattened by a group of heat-set rolls 19, which can be substituted with heating apparatuses other than rolls.

The uniaxially stretched film thus prepared can be slit into a width as small as 0.5 mm., according to the conventional method.

The present invention will be further illustrated by the following examples, which are not limitative.

Example 1

A crystalline polypropylene having a melt flow rate of 3.5 (according to ASTM D-1238-57T) was extruded through an extruder having an inner diameter of 65 mm. and cooled by water to prepare a tubular film having a folded width of 300 mm. and a thickness of 100μ, which was stretched by continuously passing through the stretching apparatus of FIG. 1.

The conditions employed were as follows:

Diameter of mandrel 12: 190 mm., length of mandrel 12: 50 mm.

Feeding rate: 5 m./min., drawing rate: 65 m./min.

Contacting length of supporting roll 5 and receiving roll 6: 205 mm.

Contacting length of supporting roll 5' and receiving roll 6': 205 mm.

Receiving rolls were driven and rotated at a peripheral speed 3% greater than that of feeding pinch rolls 3.

One set of rolls 7 and 8 for preventing deviation and rolls 10, 10', 11, 11' for preventing swinging were used.

A heated-air-circulating type oven was employed as heater 15.

The stretched tubular film thus prepared had a folded width of 240 mm. and a thickness of 19μ. Even when this film was put between two palms of hands and rubbed 20 times, no splitting occurred. On the other hand, uniaxially stretched films according to the conventional method were split by rubbing 2 or 3 times.

Example 2

Using the same unstretched tubular film as in Example 1 and the same stretching apparatus as in Example 1, films having the proportions of the width of stretched film to that of unstretched film and the stretching ratios in the longitudinal direction, as shown in Table 1, were prepared. The resulting film were then slit into tapes having a width of 5 mm., and their strengths at breakage (Unit: g./denier) were measured. The results are shown in Table 1.

TABLE 1

| Stretching ratio | (Width of stretched film)/(width of unstretched film) | | | |
|---|---|---|---|---|
| | 60% | 70% | 80% | 90% |
| 5 | 3.8 | 3.7 | 3.4 | 3.3 |
| 6 | 4.7 | 4.9 | 4.6 | 3.5 |
| 7 | 5.15 | 5.9 | 5.6 | 4.3 |

Example 3

A uniaxially stretched tubular film was prepared under the same conditions as in Example 1, except that the contacting line of supporting roll 5 and receiving roll 6 and that of supporting roll 5' and receiving roll 6' were both 120 mm.

In this case, the total sum of the contacting lines as mentioned above is ⅖ of the peripheral length of the tubular film at this part.

The stretching of the film was carried out without any trouble.

Example 4

The uniaxially stretched tubular film of polypropylene as prepared in Example 1, was slit into a width of 1 mm., over 100 m., and at a speed of 300 m./min. As a result, 460 tapes having no fluff could be prepared. During the slitting, no breakage of tapes occurred at all.

We claim:

1. An apparatus for producing a uniaxially stretched tubular film of thermoplastic resin which is difficult to split in the longitudinal direction, from unstretched tubular film, which comprises
    (a) a first set of pinch rolls for feeding an unstretched tubular film of thermoplastic resin downwardly,
    (b) a mandrel and a mandrel hanger positioned beneath said pinch rolls,
    (c) the upper portion of said mandrel hanger having two elongated supported rolls rotatably mounted thereon, said supported rolls being disposed substantially parallel to each other and being adapted to contact the interior portion of said tubular film that is fed downwardly from said pinch rolls,
    (d) two elongated substantially parallel supporting rolls located in abutting and supporting relationship with said two elongated supported rolls and adapted to contact the exterior portion of the tubular film that is fed downwardly from said pinch rolls,
    (e) said mandrel having a 50–400 ASTM mesh surface finish and a peripheral length equal to or slightly smaller than the peripheral length of the unstretched part of the tubular film to be uniaxially stretched and a circular cross section, which mandrel is suspended beneath said mandrel hanger, which in turn is supported by the abutting and supporting relationship between said supporting and supported rolls;
    (f) a heater located adjacent to the mandrel which heats that portion of the tubular film that is close to the mandrel, and
    (g) a second set of pinch rolls located beneath said mandrel and which rolls are adapted to draw out the uniaxially stretched film, the peripheral speed of said second set of pinch rolls being greater than that of said first set of pinch rolls,
    (h) said supported rolls contacting with said supporting rolls along two parallel contact lines that are either solid or broken, the total length of said two parallel contact lines being equal to at least one-third of the peripheral length of said mandrel,
    (i) gas inlet means for applying pressure to the interior of the tubular film along that portion of the tubular film which extends between said mandrel and said second set of pinch rolls, (j) said mandrel hanger being provided with at least one additional set of mutually abutting rolls having axes disposed at substantially right angles to the axes of said supported and supporting rollers, whereby said supported and supporting rolls are prevented from moving in the direction of their axes, (k) at least one added set of rolls, each such added set being located below said supporting rolls of (d) and above said mandrel, one of the rolls of each added set being positioned on the inside of the tubular film and the other of said rolls of each added set being positioned on the outside of the tubular film, and (l) an open passageway in said mandrel which permits open communication between the space above the upper side of the mandrel and the space beneath the lower side of the mandrel.

2. An apparatus for producing a uniaxially stretched tubular film of thermoplastic resin which is difficult to split in the longitudinal direction, from unstretched tubular film, which comprises (a) a first set of pinch rolls for feeding an unstretched tubular film of thermoplastic resin downwardly, (b) a mandrel and a mandrel hanger positioned beneath said pinch rolls, (c) the upper portion of said mandrel hanger having two elongated supported rolls rotatably mounted thereon, said supported rolls being disposed substantially parallel to each other and being adapted to contact the interior portion of said tubular film that is fed downwardly from said pinch rolls, (d) two elongated substantially parallel supporting rolls located in abutting and supporting relationship with said two elongated supported rolls and adapted to contact the exterior portion of the tubular film that is fed downwardly from said pinch rolls, (e) said mandrel having a 50–400 ASTM mesh surface finish and a peripheral length equal to or slightly smaller than the peripheral length of the unstretched part of the tubular film to be uniaxially stretched and a circular cross section, which mandrel is suspended beneath said mandrel hanger, which in turn is supported by the abutting and supporting relationship between said supporting and supported rolls;

(f) a heater located adjacent to the mandrel which heats that portion of the tubular film that is close to the mandrel, and (g) a second set of pinch rolls located beneath said mandrel and which rolls are adapted to draw out the uniaxially stretched film, the peripheral speed of said second set of pinch rolls being greater than that of said first set of pinch rolls, (h) said supported rolls contacting with said supporting rolls along two parallel contact lines that are either solid or broken, the total length of said two parallel contact lines being equal to at least one-third of the peripheral length of said mandrel, and (i) gas inlet means for applying pressure to the interior of the tubular film along that portion of the tubular film which extends between said mandrel and said second set of pinch rolls.

3. An apparatus according to claim 2 wherein said mandrel hanger is provided with at least one additional set of mutually abutting rolls having axes disposed at substantially right angles to the axes of said supported and supporting rollers, whereby said supported and supporting rolls are prevented from moving in the direction of their axes.

4. An apparatus according to claim 2 which contains at least one added set of rolls, each added set being located below said supporting rolls of (d) and above said mandrel, one of the rolls of each added set being positioned on the inside of the tubular film and the other of said rolls of each added set being positioned on the outside of the tubular film.

5. An apparatus according to claim 2 wherein said mandrel contains an open passageway which permits open gas communication between the space above the upper side of the mandrel and the space beneath the lower side of the mandrel.

6. A process for producing a uniaxially stretched tubular film of crystalline polyolefin difficult to split in the longitudinal direction from an unstretched tubular film of crystalline polyolefin which comprises passing said unstretched tubular film through the nip of feeding roll means, then the nips of two parallel sets of mutually abutting roll means for supporting a mandrel, then passing vertically downwards over the outside surface of said mandrel while enveloping the latter and while being heated from the outside and then drawing out the resultant film by a roll means whose peripheral speed is greater than that of feeding roll means to effect longitudinal stretching of 3–8 times the original length, which is characterized in that the surface of the mandrel has a rough finish of from 50 to 400 meshes according to ASTM standards; that the peripheral length of the mandrel is made equal to or slightly smaller than that of the film to be stretched; that the total sum of the nip lines of two parallel sets of mutually abutting roll means for supporting the mandrel is at least one third of the peripheral length of the mandrel; that the film is contacted with the surface of the mandrel over the entire peripheral length, stretched longitudinally at least during the contact, and prevented from its lateral shrinkage by the mandrel; and that the pressure of an internally supplied gas below said mandrel is so controlled that the film between said mandrel and said drawing rolls is restrained from its lateral shrinkage to give a width of 60–95° of that of the unstretched film.

7. A process for producing uniaxially stretched crystalline polyolefin tapes which is characterized by slitting a uniaxially stretched tubular film of crystalline polyolefin prepared according to the process of claim 6.

References Cited

UNITED STATES PATENTS

| | | | |
|---|---|---|---|
| 3,678,545 | 7/1972 | Hino et al. | 264—210 R |
| 3,608,019 | 9/1971 | Sato et al. | 264—95 |
| 3,600,479 | 8/1971 | Yazawa et al. | 264—210 R |
| 3,313,870 | 4/1967 | Yazawa | 264—290 |
| 3,426,113 | 2/1969 | Yazawa | 264—95 |
| 3,294,882 | 12/1966 | Lutzmann et al. | 264—210 R |

ROBERT F. WHITE, Primary Examiner

J. R. THURLOW, Assistant Examiner

U.S. Cl. X.R.

26—55, 56; 264—146, 288; 425—66